(12) United States Patent
Miyake et al.

(10) Patent No.: US 6,318,810 B1
(45) Date of Patent: Nov. 20, 2001

(54) MOTORCYCLE MODULAR CARRIER RING

(75) Inventors: Frank T. Miyake, 1240 Rancho Encinitas Dr., Encinitas, CA (US) 92024; Kirk A. Hoeppner, Silvardo, CA (US)

(73) Assignee: Frank T. Miyake, Encinitas, CA (US)

( * ) Notice: Subject to any disclaimer, the term of this patent is extended or adjusted under 35 U.S.C. 154(b) by 0 days.

(21) Appl. No.: 09/519,137

(22) Filed: Mar. 6, 2000

(51) Int. Cl.[7] .................................................. B60B 27/00
(52) U.S. Cl. .................. 301/110.5; 301/6.8; 188/218 XL
(58) Field of Search .................................. 301/110.5, 59, 301/6.8; 74/594.2; 188/218 XL

(56) References Cited

U.S. PATENT DOCUMENTS

| | | | |
|---|---|---|---|
| 1,942,029 | * | 1/1934 | Lane ............................... 188/218 XL |
| 2,015,890 | * | 10/1935 | Gottschalk ..................... 188/218 XL |
| 2,161,359 | * | 6/1939 | Lambert .............................. 301/6.8 X |
| 3,709,561 | * | 1/1973 | De Biasse et al. ..................... 301/6.8 |
| 4,634,189 | * | 1/1987 | LeBlond et al. ............... 301/110.5 X |
| 5,312,844 | * | 5/1994 | Gonsior et al. .................... 301/5.3 X |
| 5,797,658 | * | 8/1998 | Larrucea ............................... 301/5.3 |
| 5,897,170 | * | 4/1999 | Kelney ................................ 301/5.3 |

* cited by examiner

Primary Examiner—Stephen T. Gordon
Assistant Examiner—Patricia Engle
(74) Attorney, Agent, or Firm—John J. Murphey, Esq.

(57) ABSTRACT

A modular carrier ring for a motorcycle wheel hub assembly comprising a flat plate including a central flange forming a center bore therein for placement over the wheel hub, the central flange having a plurality of spaced-apart first through-holes formed therein for matching assembly with a like plurality of spaced-apart second through-holes formed in the wheel hub, the first through-holes and the second through-holes arranged for receipt therein of threaded fastening means to hold the flange tightly against the wheel hub, the central flange having a plurality of spaced-apart shallow apertures formed therein, in sequentially spaced arrangement with the first through-holes, for matching assembly with a like plurality of shallow apertures formed in the wheel hub for receipt therebetween of non-threaded anchor pins, a plurality of spaced-apart cross-arms extending outward from the central flange terminating in an anchor ring, and a plurality of tabs extending outward from the anchor ring each of the tab having formed therein a through hole for attachment to a wheel component of the motorcycle.

17 Claims, 6 Drawing Sheets

MOTORCYCLE MODULAR CARRIER RING

BACKGROUND OF THE INVENTION

1. Field of the Invention

This invention pertains to the field of motorcycles and their components. More particularly, the invention pertains to a novel modular carrier ring which is mountable on one or both sides of a motorcycle wheel hub for supporting accessories such as the front and rear wheel brake rotors and the rear wheel drive sprocket and/or drive pulley.

2. Description of the Prior Art

Virtually all chain-drive or belt-drive motorcycles are driven by an open loop of chain or a rubber or composite material belt stretched between the driving sprocket, extending from the motorcycle engine, to a driven sprocket or pulley located on the hub of the rear wheel of the motorcycle. In addition, almost all motorcycles utilize disc brakes on both wheels wherein a brake disc is located on the hub of both front and rear wheels.

Motorcycle wheels generally comprise a central cylindrical element called a "hub" that has a dual function, namely centrally anchors a plurality of spokes or other wheel supporting elements attached to a circularly peripheral rim that ultimately supports a tire thereabout and holds and securely mounts the brake rotor in the front wheel and mounts a brake rotor and a drive sprocket or pulley in the rear wheel. The hub generally contains sleeve or ball-bearing axle support bearings and seals that surround an axle on which the wheel turns. Hubs are made in one, two or more pieces that are traditionally designed personally for each manufacturer and for each type motorcycle.

Since their introduction, motorcycles have become quite sophisticated and have components that are specially made for different environments. For instance, many manufacturers produce rim-tire combinations that find specific use on asphalt tracks as opposed to dirt tracks. Other combinations find specific use on cross-country trips and tracks containing obstacles requiring the motorcycle to be turned sharply about them or thrust into the air to jump them. A motorcyclist thus may find his or her ability to compete in certain venues limited by their ability to own the many required wheel sets (hub-rim-tire combinations). Unfortunately, manufacturers of these combinations design the components individually for each model motorcycle and, in many cases, for each year of a specific model. Without any commonality between the combinations, such a practice often raises the total cost of procuring additional wheel sets beyond the financial means of the racers.

There have been attempts to design a hub-spoke-rim combination in a modular format that allows for improved economics in this area of the motorcycle art. For instance, U.S. Pat. No. 4,508,392 discloses a wheel hub including a structure for attachment of accessories including a pair of bushings for insertion on each side of the wheel and for bolting together to form a hub. The separately bolted parts have drive sprockets and other external components formed integral with the hub-halves to reduce the number of components needed to attach brake discs and sprockets to the hub. Unfortunately, each exterior part requires a special half-hub so that the overall cost of the assembly and the time to install it are not noticeably reduced over present practice.

U.S. Pat. No. 5,372,407 discloses a motorcycle wheel hub made of two halves with internal members for coupling them together and holes in the halves for anchoring spokes. This invention requires assembly by pressing the two halves together to engage the coupling members. Such a combination, however, requires mounting benches and special equipment to combine the components and this equipment is often not available at racing venues.

U.S. Pat. No. 5,988,613 discloses a wheel hub and brake disc arrangement for a vehicle wheel utilizing a lock ring to permit limited axial loading of the brake disc during use of the wheel. While this is another attempt to reduce the complications of hub mounting, the lock ring is subject to disengagement under the significant stresses of motorcycle racing. Accordingly, there remains a need for a simplified means of mounting a brake disc to a wheel hub without the need for extra parts and components.

SUMMARY OF THE INVENTION

For the motorcyclist, this invention is an inexpensive method of procuring wheel hub/tire set combinations for use in different venues of motorcycle sport riding and/or competition. The central subject of the invention is a modular carrier plate for interposition between the wheel hub and the disc brake plate for the front wheel assembly and between the wheel hub and disc brake plate and the wheel hub and the drive sprocket or drive pulley for the rear wheel assembly. In its preferred embodiment, the invention comprises a flat plate including a central flange forming a center bore for placement over the wheel axle where the central flange contains a plurality of spaced-apart through-holes for matching assembly with a like plurality of spaced-apart threaded holes formed in the wheel hub where the through-holes and the threaded holes are arranged for receipt of threaded fastening means such as bolts to hold the flat plate tightly against the wheel hub. The central flange contains a plurality of spaced-apart shallow apertures, in sequentially spaced-apart arrangement with the through-holes, for matching assembly with a like plurality of shallow apertures formed in the wheel hub for receipt therebetween of non-threaded (smooth) anchor pins. A plurality of spaced-apart cross-pieces extend outward from the central flange and terminate in an anchor ring. A plurality of tabs extend outward from the anchor ring wherein each tab has formed therein a through hole for attachment to a wheel component of the motorcycle, such as a brake disc, a drive sprocket or a drive pulley.

In another embodiment of the invention, it involves a combination motorcycle wheel comprising a hollow, cylindrical hub terminated by first and second hub end portions. A plurality of short stubs radiates outward from both the first and second hub end portions, each stub containing a pair of spoke-holding apertures. A plurality of elongated spokes extends outward from the hub in spaced-apart order terminating in a wheel rim that is designed to support a tire about the outside of the rim. Each elongated spoke is terminated at one end by a fitting arranged to anchor in one of the stub apertures and is terminated at the other end by an adjustable fitting, such as a hollow, threaded sleeve with cross-head, attached to the inner portion of the wheel rim. A pair of sleeve or ball-bearings are located in the hollow hub for supporting an axle centrally position in the hub and extending beyond the hub end portion. A flat plate is included with a central flange forming a center bore for placement over the wheel hub axle and the first hub portion. The central flange contains a plurality of spaced-apart through-holes for matching engagement with a like plurality of spaced-apart threaded holes formed in the first hub portion. The through-holes and the threaded holes are arranged for receipt therein of threaded fastening means, such as bolts, to hold the plate tightly against the first hub portion. The central flange has a plurality of spaced-apart shallow apertures formed therein, in sequentially spaced arrangement with the through-holes, for matching engagement with a like plurality of shallow apertures formed in the wheel hub for receipt therebetween of non-threaded (smooth) anchor pins. A plurality of spaced-apart cross-pieces extends outward from the central flange and terminate in an anchor ring. A plurality of tabs extend outward from the anchor ring wherein each tab contains a through hole for attachment to a wheel component of the motorcycle.

Accordingly, the main object of this invention is a means of assembling a variety of wheel sets for use on a specific motorcycle by the use of a modular carrier plate or plates that mate with the mounting holes of the various brake discs, various drive sprockets, and various drive pulleys with a single design of a wheel hub. The main benefit of this invention is the use of one hub-spoke-rim design and a plurality of modular carrier rings to mount enough different types and designs of disc brakes and sprockets so that the motorcycle enthusiast need not purchase a variety of expensive wheel sets for use in a variety of motorcycle racing venues thus saving funds that may be more efficiently used elsewhere. The modular carrier ring of this invention, used in combination with one of the low cost hub-spoke-rim modular assemblies currently on the market, means that a variety of such tire designs may be mounted on the modular assembly and used on a variety of motorcycles thus reducing not only the cost of equipment to the motorcyclist but reducing the time normally used to mount and adjust each of the manufacturer's specific designs on different hub-spoke-rim combinations.

These and other objects of the invention will become more clear when one reads the following specification, taken together with the drawings that are attached hereto. The scope of protection sought by the inventors may be gleaned from a fair reading of the claims that conclude this specification.

DESCRIPTION OF THE PREFERRED EMBODIMENTS

Figure 1:
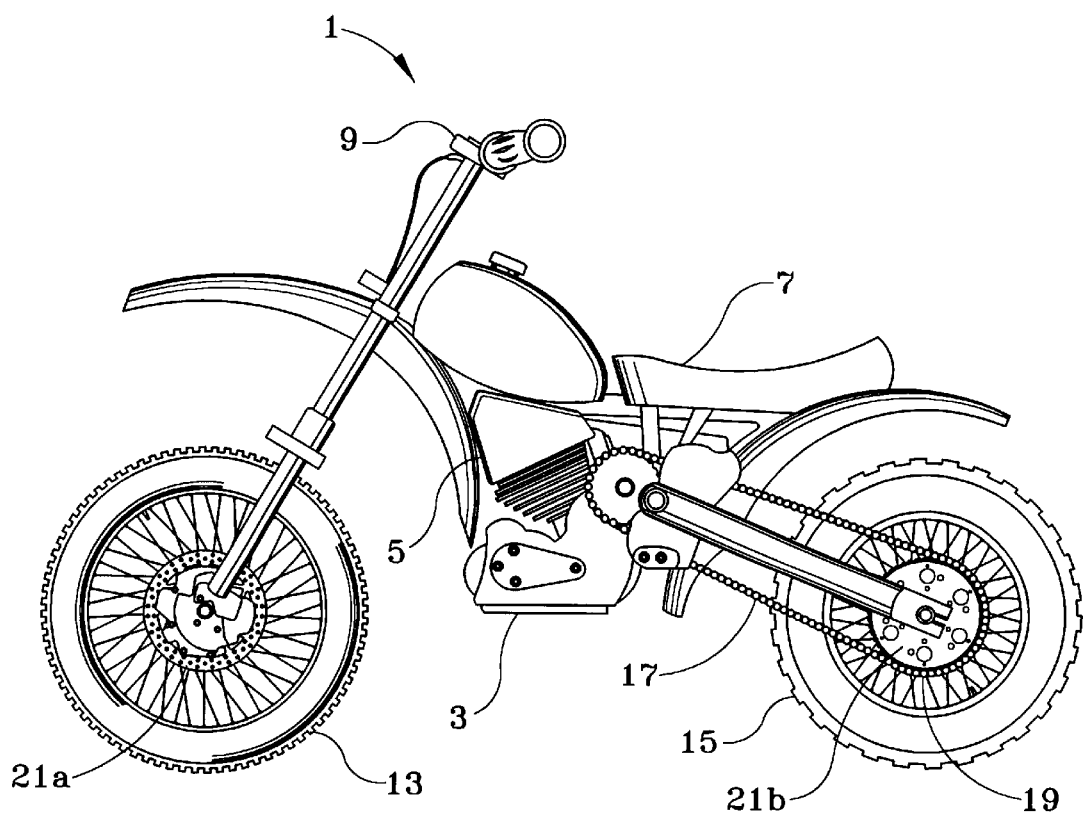
FIG. 1 is a side view of a typical motorcycle for which this invention is useful.

Turning now to the drawings wherein elements are identified by numbers and like elements are identified by like numbers throughout the eleven figures, the invention is applicable to a motorcycles such as of the type shown in FIG. 1. The motorcycle is generally divided into a body 1, having a motor 3 attached to a frame 5 wherein a motorcyclist (not shown) sits in a seat 7 and steers the motorcycle using handle bars 9. A front wheel 13, attached to handle bars 9, and a rear wheel 15, powered by motor 3, allow the motorcycle to move over the ground. In FIG. 1, the motorcycle is powered by a chain spanning a motor-mounted driven sprocket (not shown) and a drive sprocket 19 mounted on rear wheel 15. The motorcycle is braked by the use of brake pads (not shown) that engage brake discs 21a and 21b, mounted on front and rear wheels 13 and 15, respectively.

Figure 2:
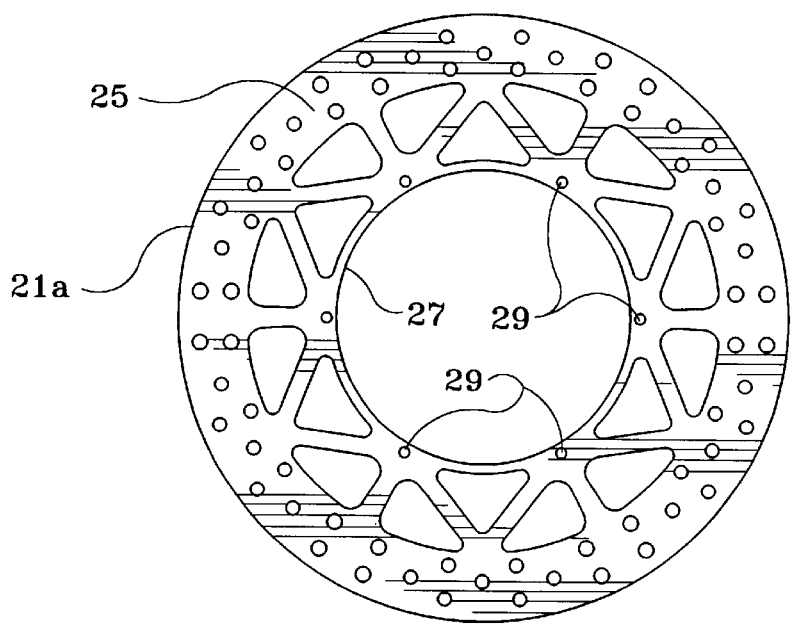
FIG. 2 is a side view of a typical brake disc that may be mounted to the wheels of a motorcycle using this invention.
Figure 3:
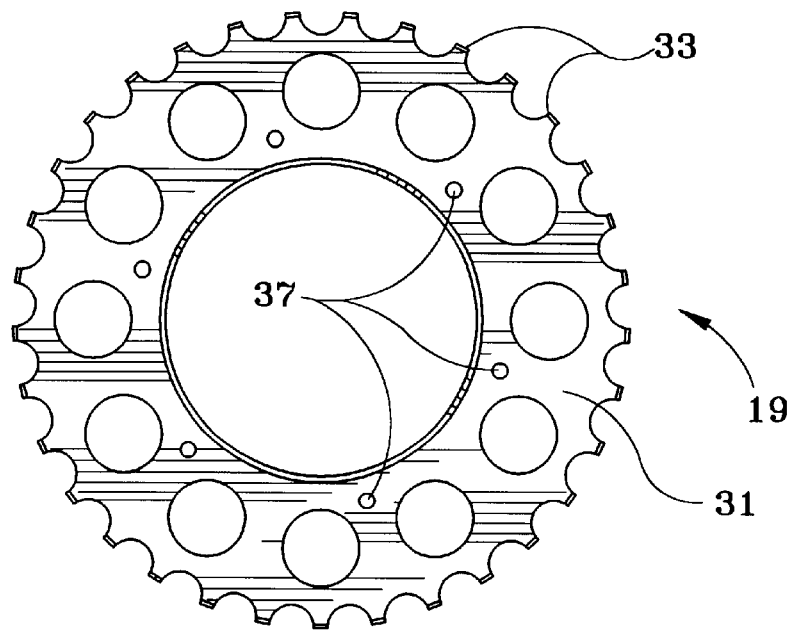
FIG. 3 is a side view of a portion of a typical drive sprocket that may be mounted to the wheels of a motorcycle using this invention.
Figure 4:
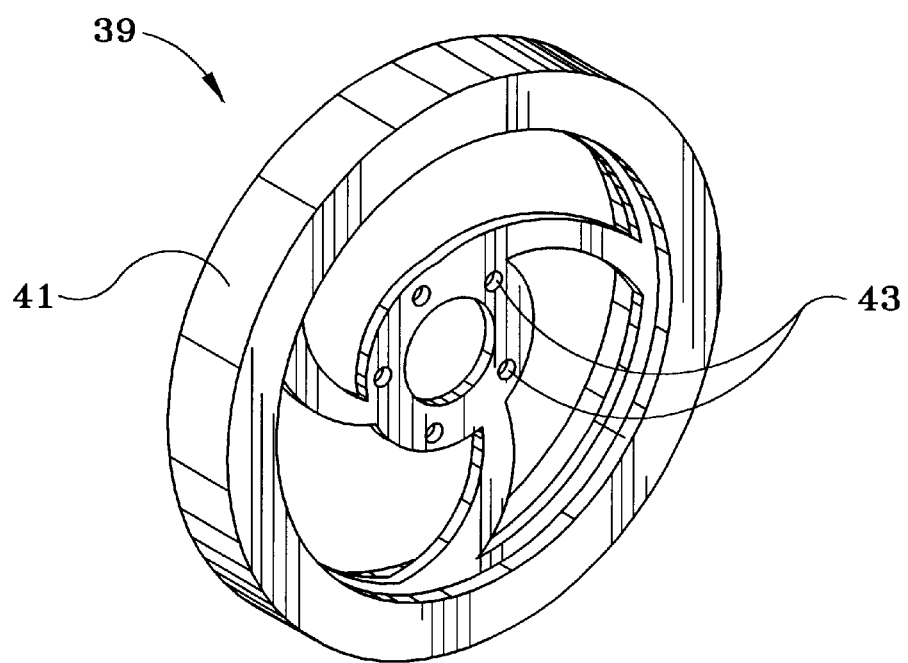
FIG. 4 is a side view of a typical belt drive wheel that may be mounted to the wheels of a motorcycle using this invention.

Front wheel brake disc 21a is shown in FIG. 2 to comprise a outer braking surface supported by an inner ring 27 having a plurality of holes 29 formed thereabout for mounting against front wheel 13. FIG. 3 shows a typical drive sprocket 19 that comprises a disc 31, having a plurality of drive teeth 33 formed about the outer periphery thereof, and a series of holes 37 formed near the inner periphery for mounting against rear wheel 15. FIG. 4 shows a drive pulley 39 for use with a drive belt in place of the chain-sprocket wheel combination. Drive pulley 39 comprises a slightly wide peripheral area 41, for receipt thereabout of a strong, elastic band or drive belt (not shown), and a plurality of holes 43 formed near the inner periphery for mounting against rear wheel 15.

Figure 5:
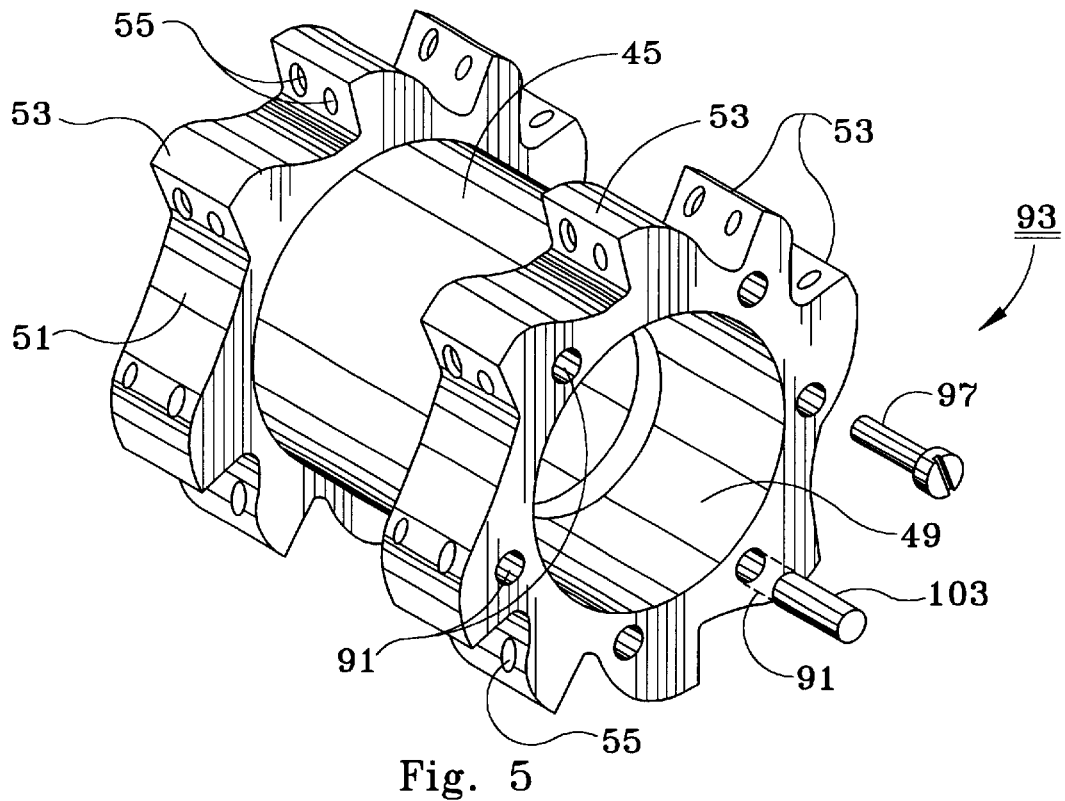
FIG. 5 is a perspective view of a hub to which the carrier plate of this invention may be mounted and used.
Figure 6:
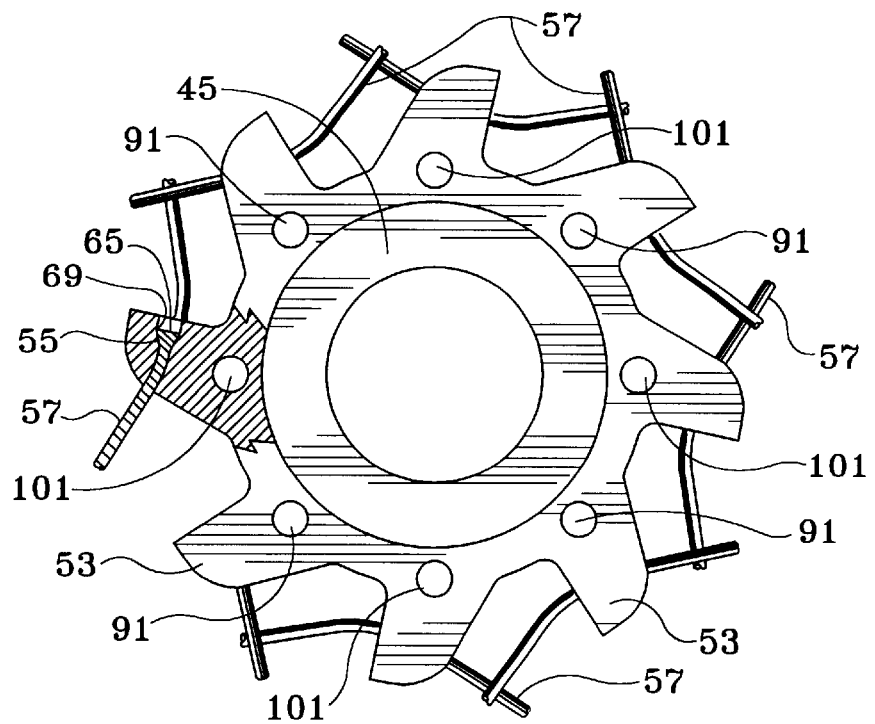
FIG. 6 is a side view, partially in section, of one end of the hub shown in FIG. 5.

As earlier stated, this invention is useful in combination with a motorcycle hub-spoke-rim combination to allow a wide variety of brake discs be mounted on the hub of the combination to reduce the number of such combinations a motorcyclist must purchase to participate in various motorcycle racing venues. A typical hub to which the invention is attached is shown in FIGS. 5 and 6 and comprises a hollow, cylindrical hub 45 of finite length terminated by first and second hub end portions 49 and 51 respectively. Hub 45 has a dual function, namely to suspend the wheel rim and tire assembly in place with the use of spokes and to hold and secure with fasteners the brake disc in a front wheel application and a brake disc and drive sprocket or drive pulley in a rear wheel application. Hub 45 is usually made from aluminum and its alloys, stainless steel, high tensile strength carbon steel, and in some instances titanium.

Figure 7:
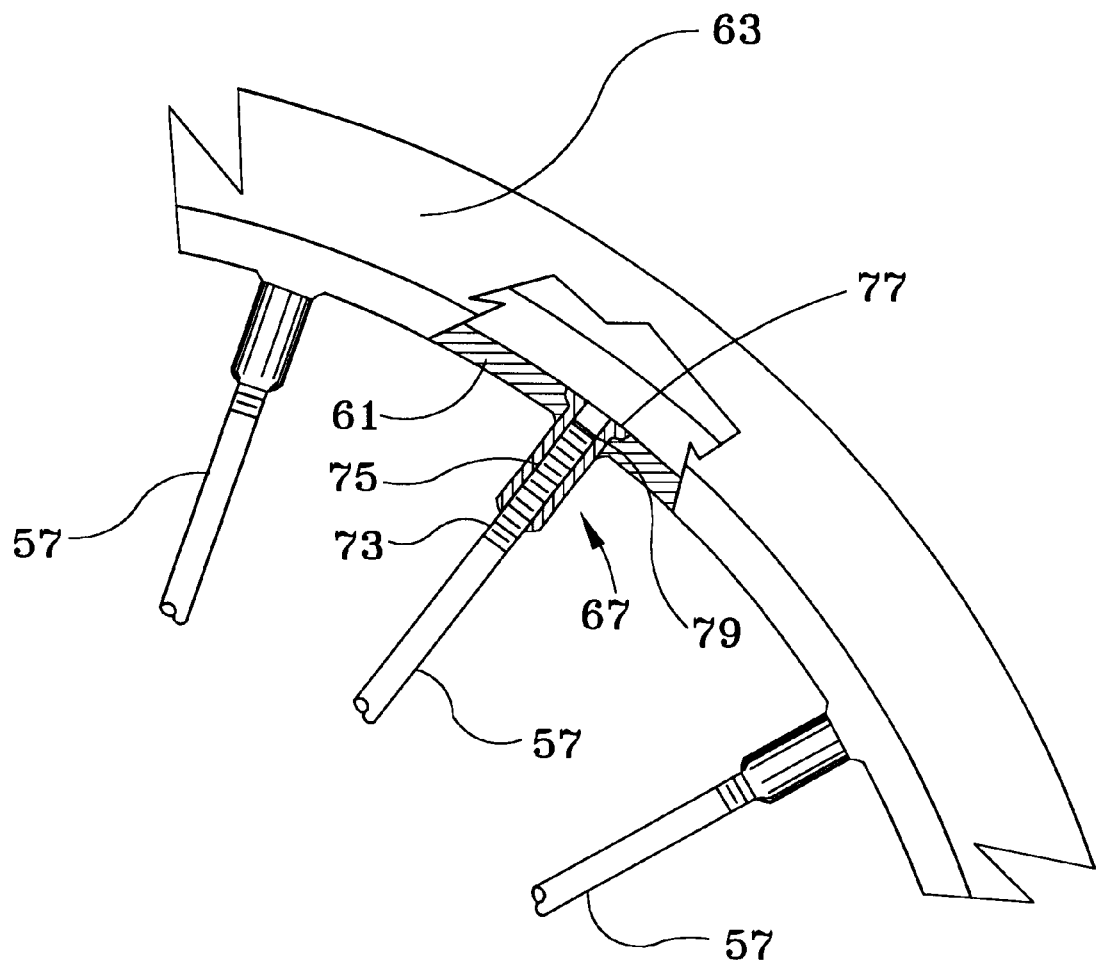
FIG. 7 is a partial side view, partially in section, of a portion of a typical tire rim wherein this invention may be used.

A plurality of short stubs 53 radiate outward from first and second hub end portions 49 and 51, each said stub having formed therein a pair of apertures 55. It is preferred that the number of short stubs 53 is equally divided between first hub end portion 49 and second hub end portion 51 so that each said stub portion supports an equal amount of spokes. A plurality of elongated spokes 57 (see FIGS. 6 and 7) extend outward from each hub portion 49 and 51 in spaced-apart regular order toward and terminating at the inside wall 61 of a tire rim 63. It is preferred that each spoke 57 is terminated at one end by a fixed fitting 65 arranged to anchor in one of stub apertures 55 and is terminated at the other end by an adjustable fitting 67 attached to wheel rim inside wall 61.

Wheel spokes 57 are subject to significant stress when the motorcycle is moved at a fast pace, is jumped over an obstacle, and is sharply swerved about a race course. Accordingly, it is common for these spokes to be made thick, such a $1/16$ to $3/64$ of an inch in diameter, and made of strong metal alloys, such as carbon steel and the like. Spoke end fixed fitting 65, formed on the inner end of spoke 57, preferably takes the form of a flattened end portion (see FIG. 6) 69 made large enough that it cannot pass through stub aperture 55 and thus holds the end of the spoke tightly in stub 53. This type of anchoring of spoke 57 in hub stub 53 is known as "straight pull" anchoring of the hub in tire rim 63. Straight pull spoking, in combination with the carrier plate of this invention and the hub described above, provides a very high strength combination of hub, spoke and tire such that it will handle almost an unlimited combination of wheels so that the motorcyclist can rely on this combination to provide the necessary strength and endurance of wheels for virtually any motorcycle racing venue.

Spoke outer end adjustable fitting 67 is preferably a combination of threads 73 for receipt in a threaded sleeve 75 topped by a flat head 77 that is anchored in an aperture 79 formed in inside rim wall 61. Sleeve 75 may be twisted, such as by a screw driver inserted in a slot (not shown) formed in flat head 77, to impart more elongated stress on spoke 57 to centralize hub 45 at the center of the wheel. An inflated rubber tire is normally placed about rim 63.

Bearing means, usually in the form of a ball-bearing (not shown), are positioned in a hollow area formed inside hub 45 for supporting an axle (not shown) centrally position in hub 45 and, in some cases, extending beyond first and second hub end portions 49 and 51.

Figure 8:
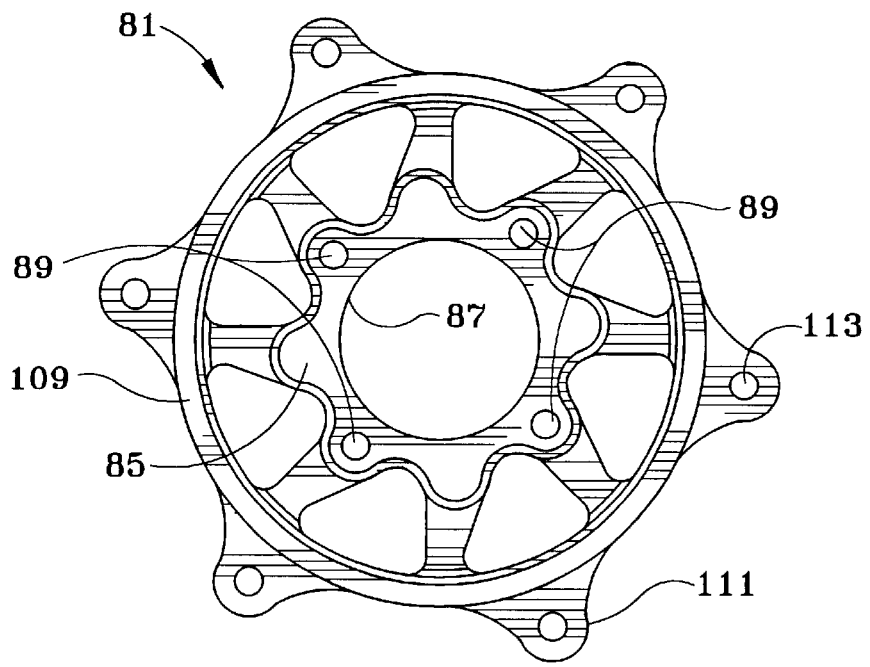
FIG. 8 is a front view of the preferred embodiment of the carrier plate of this invention.
Figures 9, 10:
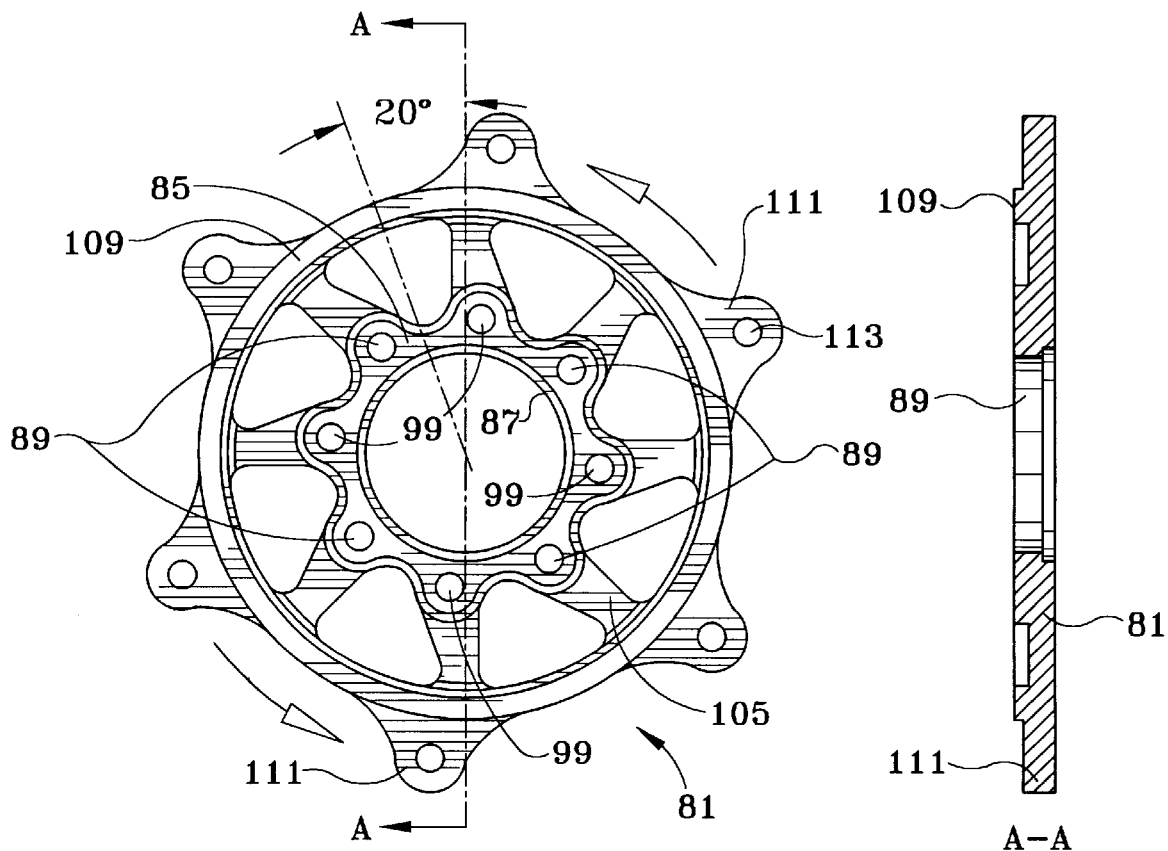
FIG. 9 is a rear view of the embodiment of the carrier plate shown in FIG. 8.
FIG. 10 is a sectional side view of the embodiment of the carrier plate shown in FIGS. 8 and 9; and, FIG. 11 is a perspective view of a typical motorcycle wheel hub to which is mounted a carrier ring of this invention on both ends or sides of the hub.

As shown in FIGS. 8, 9 and 10, the inventive carrier plate 81 of this invention includes a flat or planar central flange 85 forming a center bore 87 therein, for placement over the wheel axle and against first hub portion 49. As shown in FIGS. 8 and 9, central flange 85 has a plurality of spaced-apart first through-holes 89 formed therein for matching assembly with a like number of spaced-apart second through or threaded holes 91 (see FIG. 6) formed in first hub portion 49. First through-holes 89 and second through or threaded holes 91 are arranged to match up and thereafter receive therein a fastening means 93 such as threaded bolts 97 to hold central flange 85 tightly against first hub portion 49.

Central flange 85 also has a plurality of spaced-apart shallow first apertures 99 formed therein, in sequentially spaced arrangement with through-holes 89, such as between them, for matching engagement or assembly with a like plurality of shallow second apertures 101, formed in first wheel hub portion 49, for receipt therebetween of non-threaded or smooth>surfaced anchor pins, roll pins or dowels 103. As both first and second apertures 99 and 101 are shallow, i.e., do not pass completely through central flange 85, their mutual assembly will hold anchor pins 103 therein without any need for further fastening such as by threads or the like.

As shown in FIGS. 8 and 9, a plurality of spaced-apart cross-arms 105 extend outward from the outer periphery of central flange 85 and in the same plane thereof and terminate in an anchor ring 109. Anchor ring 109 is preferably thicker (see FIG. 10) than either central flange 85 and cross-arms 105 so that it localizes the stress and possible distortion between hub 45 and the motorcycle component later attached to it and attenuates these stresses and strains over a larger area. It is preferred that cross-arms 105 are slanted in the direction of rotation of the motorcycle wheel (see arrows in FIG. 9 indicating direction of rotation), when it is in forward motion, to further distribute the stresses therein and reduce distortion of anchor ring 109 under instances of induced severe torque to the motorcycle wheel such as when the motorcycle is raced, jumped over obstacles, sharply swerved, etc. The preferred angle of slanting of cross-arms 109 is about 20° as shown in FIG. 9.

Figure 11:
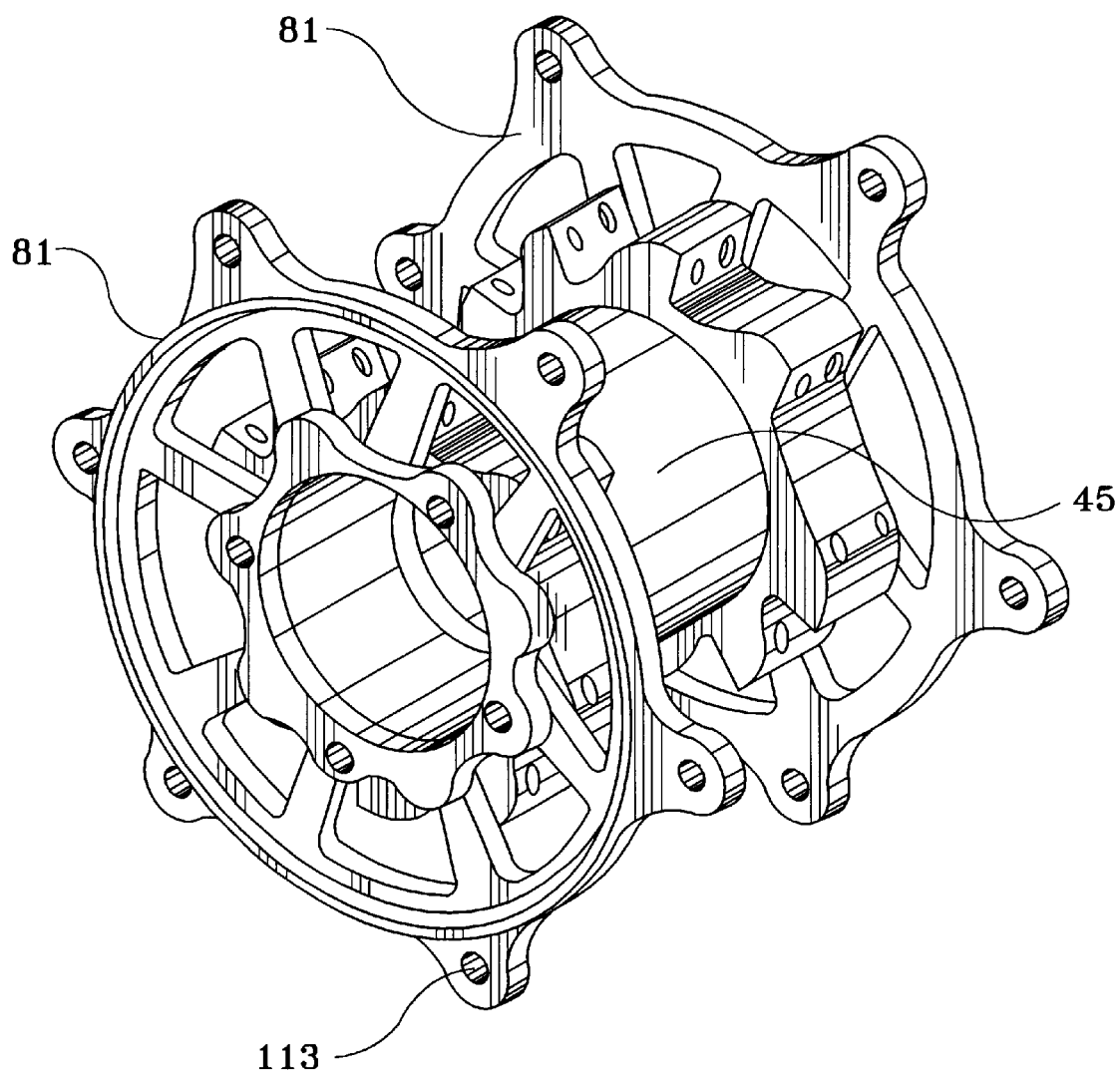

A plurality of tabs 111 extend outward from anchor ring 109. Each tab 111 has formed therethrough a hole 113 for receipt of a bolt or other fastening means for anchoring a motorcycle brake disc at holes 29, a drive sprocket at holes 37, or a drive pulley at holes 43. In some cases, tabs 111 are grouped in pairs, (as shown in FIGS. 8 and 9) or triplets about anchor ring 109 to match up with a particular design of brake disc or drive sprocket or drive pulley. As shown in FIG. 11, a typical rear motorcycle wheel hub 45 is shown having carrier plates 81 of this invention attached to both first and second hub portions 49 and 51 respectively in order to mount a brake disc and either a drive sprocket or a drive pulley thereto.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A modular carrier plate for a motorcycle wheel hub-axle assembly comprising:
    a) a central flange forming a center bore therein for placement against the wheel hub portion of the assembly in alignment with the axle;
    b) said central flange having a plurality of spaced-apart first through-holes formed therein for alignment with a like plurality of spaced-apart second through-holes formed in the wheel hub portion of the assembly, said first through-holes and said second through-holes arranged for receipt therein of threaded fastening means to hold said central flange tightly against the wheel hub portion of the assembly;
    c) a plurality of spaced-apart cross-arms extending outward from said central flange terminating in an anchor ring; and,
    d) a plurality of tabs extending outward from said anchor ring each said tab having formed therein a through hole for attachment to a wheel component of the motorcycle;
    e) wherein said central flange and the anchoring are thicker than said cross-arms.

2. The modular carrier plate for a motorcycle wheel hub-axle assembly of claim 1 further including a plurality of spaced-apart shallow first apertures formed in said central flange, in sequentially spaced arrangement from said first through-holes, for alignment with a like plurality of shallow second apertures formed in the wheel hub portion of the assembly for receipt therebetween of non-threaded anchor pins.

3. The modular carrier plate for a motorcycle wheel hub-axle assembly of claim 1 wherein said wheel component for assembly with said modular carrier plate is selected from the group consisting of a brake disc, a drive sprocket, and a drive pulley.

4. The modular carrier plate for a motorcycle wheel hub-axle assembly of claim 1 wherein said plate is made from metals selected from the group consisting of aluminum, stainless steel, carbon steel, titanium, and alloys thereof.

5. The modular carrier plate for a motorcycle wheel hub-axle assembly of claim 1 wherein said plurality of spaced-apart cross-arms extending outward from said central flange are formed in the plane of said carrier ring and slanted in the direction of rotation of the motorcycle wheel in driving motion.

6. In combination, a motorcycle wheel comprising:
   a) a hollow, cylindrical hub of finite length terminated by first and second hub end portions;
   b) a plurality of short stubs radiating outward from said first and second hub end portions each said stub having formed therein a pair of apertures;
   c) a plurality of elongated spokes extending outward from said hub in spaced-apart order terminating in a wheel rim, each said spoke terminated at one end by a fitting arranged lo anchor in one of said stub apertures and terminated at the other end by an adjustable fitting attached to said wheel rim;
   d) bearing means in said hollow hub for supporting an axle centrally position in said hub and extending beyond said hub end portions;
   e) a flat plate including a central flange forming a center bore therein for placement over said wheel hub axle and against said first hub portion;
   f) said central flange having a plurality of spaced-apart first through-holes formed therein for alignment with a like plurality of spaced-apart second through-holes formed in said first hub portion, said first through-holes and said second through-holes arranged for receipt therein of threaded fastening means to hold said flange tightly against said first hub portion;
   g) a plurality of spaced-apart cross-arms extending outward from said central flange terminating in an anchor ring; and,
   h) a plurality of tabs extending outward from said anchor ring each said tab having formed therein a through hole for attachment to a wheel component of the motorcycle;
   i) wherein said central flange and the anchoring ring are thicker than said cross-arms.

7. The motorcycle wheel combination of claim 6 wherein said central flange has a plurality of spaced-apart shallow first apertures formed therein, in sequentially spaced arrangement from said first through-holes, for alignment with a like plurality of shallow second apertures formed in said wheel hub for receipt therebetween of non-threaded anchor pins.

8. The motorcycle wheel combination of claim 6 wherein each said spoke is terminated at one end by a straight fitting arranged to anchor in one of said stub apertures to form a straight-pull anchor of said spoke.

9. The motorcycle wheel combination of claim 6 wherein said wheel component for assembly with said modular carrier ring is selected from the group consisting of a brake disc, a drive sprocket, and a drive pulley.

10. The motorcycle wheel of claim 6 wherein said flat plate is made from metals selected from the group consisting of aluminum, stainless steel, carbon steel, titanium, and alloys thereof.

11. The motorcycle wheel of claim 6 wherein said plurality of spaced-apart arms extending outward from said central flange are formed in the plane of said plat plate and slanted in the direction of rotation of the motorcycle wheel in driving motion.

12. In combination, a front motorcycle wheel comprising:
   a) a hollow, cylindrical hub terminated by first and second hub end portions;
   b) a plurality of short stubs radiating outward from said first and second hub end portions each said stub having formed therein a pair of apertures;
   c) a plurality of elongated spokes extending outward from said hub in spaced-apart order terminating in a wheel rim, each said spoke terminated at one end by a fitting arranged to anchor in one of said stub apertures and terminated at the other end by an adjustable fitting attached to said wheel rim;
   d) bearing means in said hollow hub for supporting an axle centrally position in said hub and extending beyond said hub end portions;
   e) a flat plate, including a central flange forming a center bore therein, for placement over said wheel hub axle and against said first hub portion;
   f) said central flange having a plurality of spaced-apart first through-holes formed therein for alignment with a like plurality of spaced-apart second through-holes formed in said first hub portion, said first through-holes and said second through-holes arranged for receipt therein of threaded fastening means to hold said flange tightly against said first hub portion;
   g) a plurality of spaced-apart cross-arms extending outward from said central flange terminating in an anchor ring;
   h) a plurality of Labs extending outward from said anchor ring cach said tab having formed therein a through hole; and,
   i) a motorcycle brake disc having mounting holes for alignment with said tab first through-holes for anchoring said disc to said first hub portion;
   j) wherein said central flange and the anchor ring are thicker than said cross-arms.

13. The front motorcycle wheel of claim 12 wherein said central flange has a plurality of spaced-apart shallow first apertures formed therein, in sequentially spaced arrangement from said first through-holes, for alignment with a like plurality of shallow second apertures formed in said wheel hub for receipt therebetween of non-threaded anchor pins.

14. The modular carrier ring for a motorcycle wheel hub assembly of claim 12 wherein said wheel component for assembly with said modular carrier ring is selected from the group consisting of a brake disc, a sprocket drive wheel, and a pulley drive wheel.

15. The front motorcycle wheel of claim 12 wherein said carrier ring is made from metals selected from the group consisting of aluminum, stainless steel, carbon steel, titanium, and alloys thereof.

16. The front motorcycle wheel of claim 12 wherein said plurality of spaced-apart cross-arms extending outward from said central flange are formed in the plane of said carrier ring and slanted in the direction of rotation of the motorcycle wheel in driving motion.

17. In combination, a rear motorcycle wheel comprising:
   a) a hollow, cylindrical hub terminated by first and second hub end portions;
   b) a plurality of short stubs radiating outward from said first and second hub end portions each said stub having formed therein a pair of apertures;
   c) a plurality of elongated spokes extending outward from said hub in spaced-apart order terminating in a wheel rim, each said spoke terminated at one end by a fitting arranged to anchor in one of said stub apertures and terminated at the other end by an adjustable fitting attached to said wheel rim;

d) bearing means in said hollow hub for supporting an axle centrally position in said hub and extending beyond said hub end portions;

e) a pair of flat plates, each said plate including a central flange forming a center bore therein, for placement respectively over the opposite ends of said wheel hub axle and against said first and said second hub portions;

f) said central flange of each said plate having a plurality of spaced-apart first through-holes formed therein for alignment with a like plurality of spaced-apart second through-holes formed in said first and said second hub portions, said first through-holes and said second through-holes arranged for receipt therein of threaded fastening means to hold said flanges tightly against said respective first and said second hub portions;

g) said central flanges each having a plurality of spaced-apart shallow apertures formed therein, in sequentially spaced arrangement from said first through-holes, for alignment with a like plurality of shallow apertures formed in said first and second wheel hub portions for receipt therebetween of non-threaded anchor pins;

h) a plurality of spaced-apart cross-arms extending outward from each said central flange terminating in an anchor ring;

i) a plurality of tabs extending outward from each said anchor ring each said tab having formed therein a through hole;

j) a motorcycle brake disc having mounting holes for matching alignment with said tab first through-holes for anchoring said disc to said first hub portion; and, k) a motorcycle drive sprocket having mounting holes for alignment with said tab first through-holes for anchoring said disc to said second hub portion.

* * * * *

UNITED STATES PATENT AND TRADEMARK OFFICE
CERTIFICATE OF CORRECTION

PATENT NO. : 6,318,810 B1
DATED : November 20, 2001
INVENTOR(S) : Frank T. Miyake and Kirk A. Hoeppner It is certified that error appears in the above-identified patent and that said Letters Patent is hereby corrected as shown below:

Column 3,
Between lines 30 and 31, insert the following paragraph:

-- Other objects of the invention include means for attaching different designs of brake discs and different designs of drive sprockets to a universal hub-spoke-rim configuration using another design configuration carrier ring mounted on the end portions of a hub combination without becoming involved in procuring a variety of parts for assembly using special tools. --

Column 4,
Line 14, insert the number -- 17 -- after the word "chain"
Line 21, insert the number -- 25 -- after the word "surface"
Line 36, insert -- , drive sprockets, and drive pulleys to -- after the words "brake discs"
Line 67, insert a space between "1/16" and the word "to" and between "9/64" and the word "of"

Column 5,
Line 47, change "smooth>surfaced" to -- smooth-surfaced --

Column 6,
Line 46, change "anchoring" to -- anchor ring --

Column 7,
Line 14, change "lo" to -- to --
Line 39, change "anchoring ring" to -- anchor ring --

UNITED STATES PATENT AND TRADEMARK OFFICE
CERTIFICATE OF CORRECTION

PATENT NO. : 6,318,810 B1
DATED : November 20, 2001
INVENTOR(S) : Frank T. Miyake and Kirk A. Hoeppner It is certified that error appears in the above-identified patent and that said Letters Patent is hereby corrected as shown below:

<u>Column 8,</u>
Line 27, change "Labs" to -- tabs --

Signed and Sealed this

Twenty-eighth Day of May, 2002

*Attest:*

JAMES E. ROGAN
*Attesting Officer*   *Director of the United States Patent and Trademark Office*